P. T. GRIFFITH.
BALLOON, AIRSHIP, AND OTHER LEVITATING BODIES.
APPLICATION FILED OCT. 16, 1912.
1,290,979.
Patented Jan. 14, 1919.
3 SHEETS—SHEET 3.
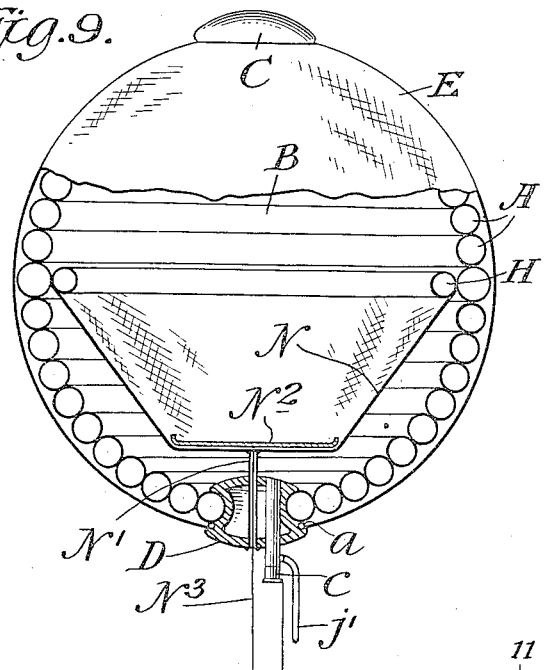
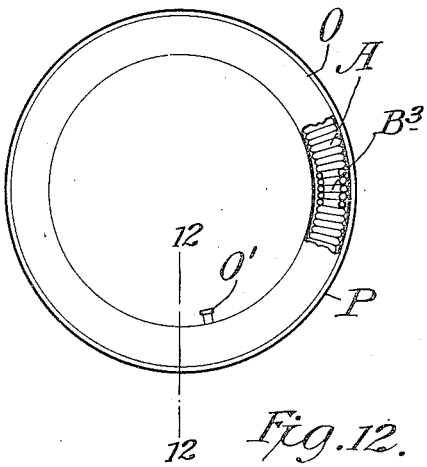
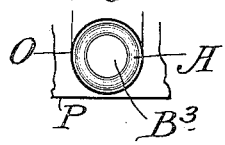
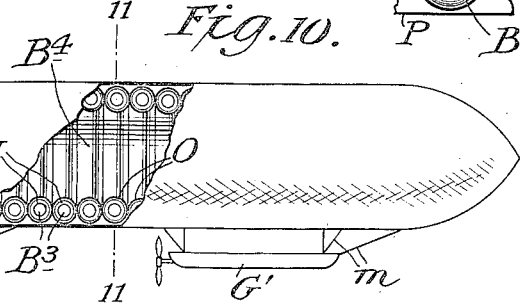
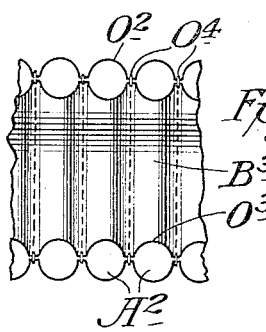
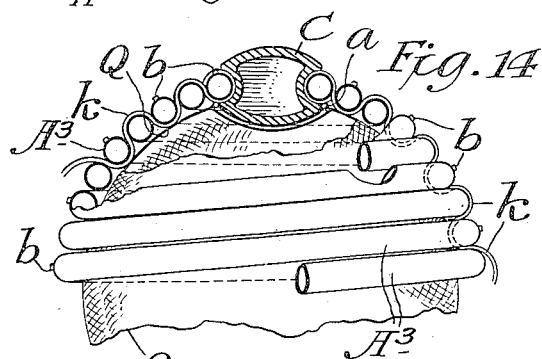
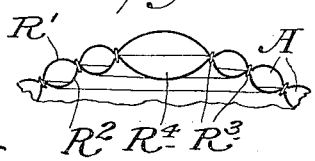
WITNESSES
INVENTOR

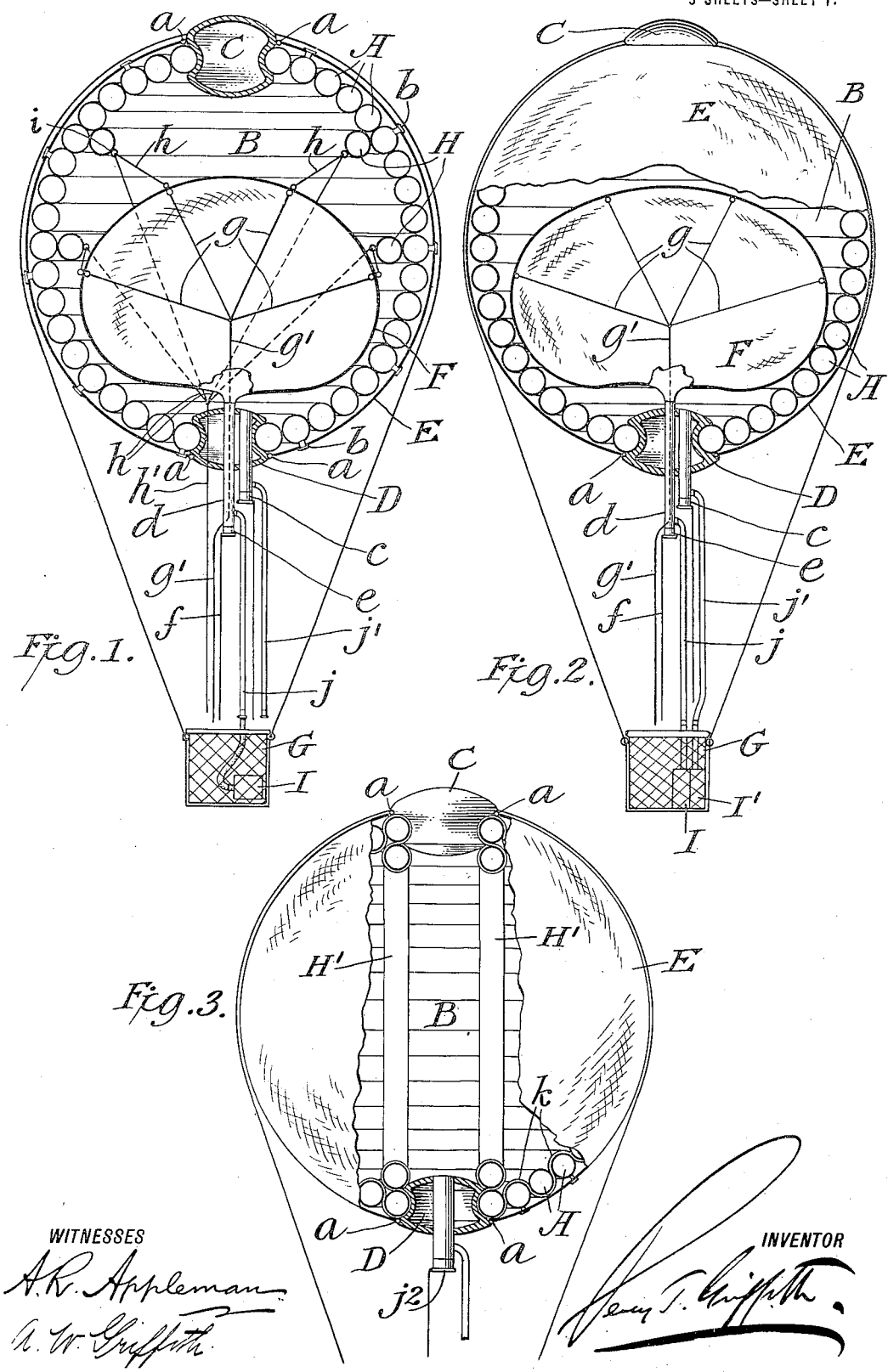

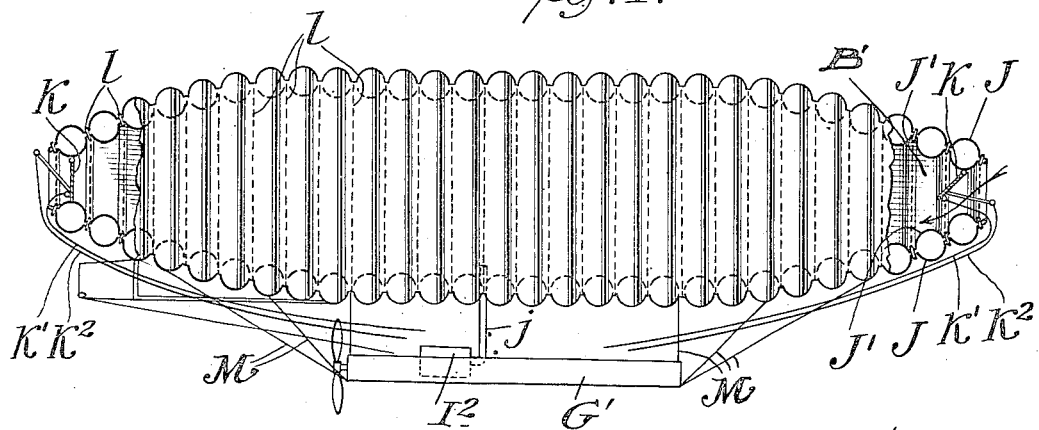
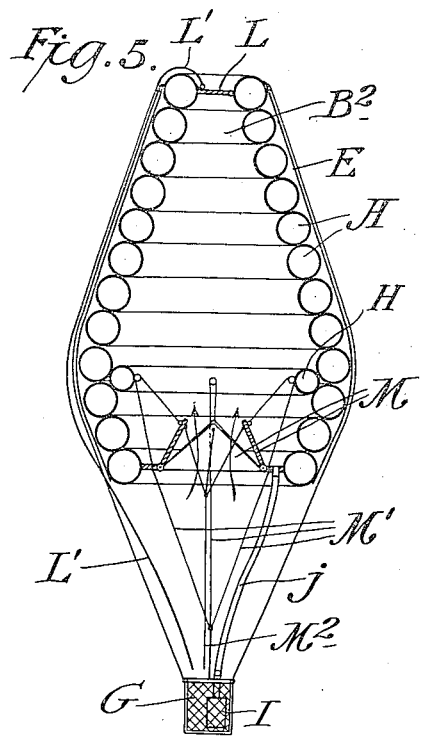
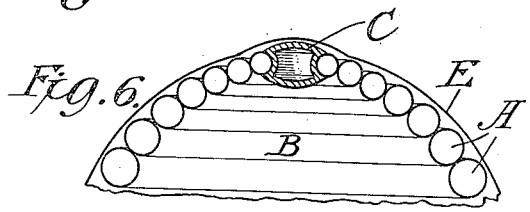
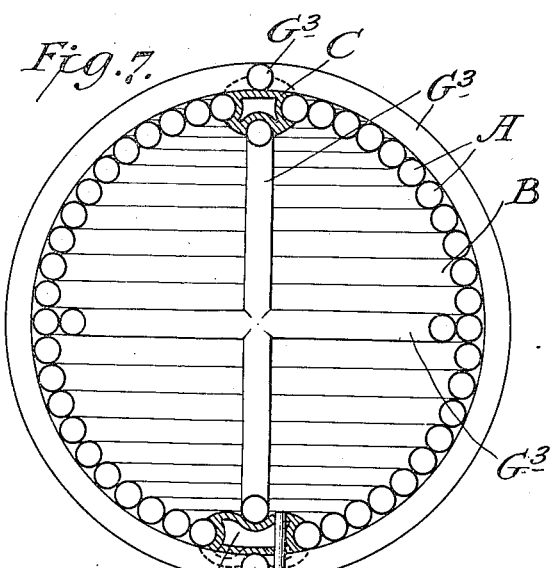
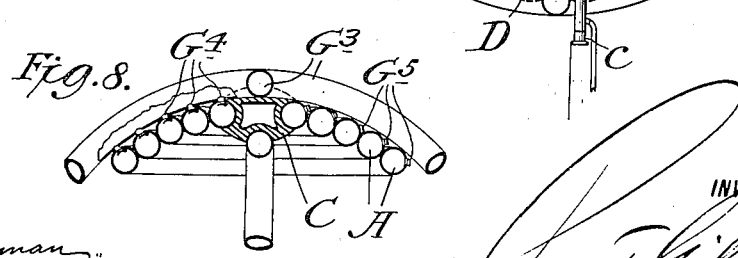

UNITED STATES PATENT OFFICE.

PERCY T. GRIFFITH, OF NEW YORK, N. Y.

BALLOON, AIRSHIP, AND OTHER LEVITATING BODIES.

1,290,979.

Specification of Letters Patent.

Patented Jan. 14, 1919.

Application filed October 16, 1912. Serial No. 726,082.

*To all whom it may concern:*

Be it known that I, PERCY T. GRIFFITH, a citizen of the United States, and residing at New York city, in the county of New York and State of New York, have invented certain new and useful Improvements in Balloons, Airships, and other Levitating Bodies, of which the following is a specification, such as will enable those skilled in the art to which it appertains to make and use the same.

This invention relates to balloons, airships and other self-levitating bodies and has for its several objects to produce a balloon or similar device which may be caused to ascend and descend at will independently of the use of any ballast or trailers; one in which the excessive rises and falls of the balloon by expansion and contraction of the gas through changes in temperature may be counteracted; one in which the volume of inflating gas needed, and the pressure thereof throughout the balloon body may be much less than customarily and the balloon more quickly filled and started; one in which all gas may be wholly dispensed with, and the balloon may be made completely self-levitating in the truest sense, without the aid of any foreign medium, and consequently capable of general and extensive use by all classes of people, in districts where gas is not obtainable, in war and in other army operations, in explorations of territory where the aeronaut, once descended, hitherto has been unable to use his balloon again, either to return or to progress farther; one finally which will be stronger and better able to withstand the strains of service and of contact with obstructions or other bodies, which will be safer both by reason of elimination or reduction to a minimum of the chances of explosion, or of wreck by the cutting or breakage of the envelop at any point; one also which will be more stable in flight or transit.

With these and other objects and functions in view, my invention consists in the novel construction, inflating means, and devices and arrangements, and the novel principles they embody, all as hereinafter set forth in these specifications, the accompanying drawings forming part thereof and the claims appended.

In the accompanying drawings forming part of these specifications, Figure 1 is a central vertical section of a balloon embodying my invention.

Fig. 2 is a similar view partly in elevation of a balloon, especially constructed according to my invention and adapted for use either with or without gas.

Fig. 3 is a similar view partly in elevation of an improved form of the invention, the car or basket being left off.

Fig. 4 is a side elevation partly in section of a cylindrical balloon or airship, embodying my invention, somewhat modified.

Fig. 5 is a view of a similar modification in the partly spherical or simple balloon form.

Fig. 6 is a fragmentary view in central vertical section of a modified form of the casing.

Fig. 7 is a central vertical section of a further modification of the casing.

Fig. 8 is a fragmentary view of the upper portion of the casing similar to Fig. 7, but further modified.

Fig. 9 is a central vertical section, partly in elevation, of a modified form of the device showing the automatic diaphragm, the car being omitted.

Fig. 10 is a side elevation partly in section of a large form of airship or dirigible balloon, showing how the invention is constructed for such exceptionally large bodies.

Fig. 11 is a section on the line 11—11 thereof partly in elevation to show the interior construction.

Fig. 12 is a cross section of Fig. 11 on the line 12—12.

Fig. 13 is a detailed sectional view of a portion of the construction of Fig. 10, slightly modified.

Fig. 14 is a fragmentary view, partly in section of a modification of the casing, being shown in the spherical form.

Fig. 15 is a similar view of another form.

In constructing my invention I form a hollow body, which in Fig. 1 is shown in spherical form, by super-posing or laying together a number of tubes or hollow rings A.

In the spherical form, as shown in Fig. 1, these tubes A are of slightly varying or graduated diameters from the center upwardly and downwardly to the top and bottom of the balloon-body.

The tubes A form a hollow central chamber B. It is closed at top and bottom by plugs C and D, which may, as shown, be hollow and inflated and are peripherally grooved, so as to lock inside the upper and lower rings A against movement out of place in either direction.

Upon the outside of the spherical body, formed by the tubes A, I place a casing or envelop E. The tubes I prefer to cement securely together and may also cement the envelop to them, or fasten it or them in any desired manner. Where the envelop or casing E passes over the plugs C and D, I may bind it around said plugs by a cord or wire $a$, so that the casing or envelop fits tightly around the tubes A and the plugs.

The hollow rings, or tubes A, when filled with air or gas distend the shell or envelop of the balloon and maintain it in that condition, independently of any interior inflation. Each of the tubes A is provided with a valve $b$ through which it may be inflated. These valves may be placed upon each tube in a position where they will be distributed over the area of the balloon-body, or they may be placed so that they will aline circumferentially.

Through the lower plug D I have shown a valve $c$ for filling the central chamber B.

Within the chamber B is arranged a bag or air-receptacle F as shown, occupying when fully air-inflated the lower portion of the chamber G.

A tube $d$ connected with the air-receptacle F extends through the lower plug D and is provided with an inlet and outlet valve $e$ controlled by a cord $f$, by means of which tube and valve the air may be forced into the receptacle F. Upon the inside of the air-receptacle are fastened cords $g$, connected to a cord $g'$, which leads through the tube D, out through the side of the same to the car or basket G, where said cords $g'$ and the cord $f$ are under the control of the aeronaut. Upon the outside of the bag or air-receptacle F are a number of cords $h$ connecting to cords $h'$ which pass through openings in the lower plug D. The cords $h$ extend outwardly from the bag or air-receptacle F through guides or pulleys $i$ mounted upon the interior of the balloon-body. As shown, I provide two interior rings H inflated and secured in position against the tubes A on which these guides or pulleys $i$ are mounted, and these rings H act also as a strengthening brace for the balloon-body. By pulling the cords $h'$ the bag or air-receptacle F is distended or opened out, and by pulling the cord $g'$ the bag is collapsed or drawn down.

In the car or basket G is provided a pump I which connects by a tube $j$ to the side of the tube $d$, by which air may be pumped into the air-receptacle F.

In this form of balloon the rings A being duly inflated either with air or gas so that the envelop is properly distended, the chamber B is charged with gas. It will be observed that an ordinary balloon must be charged with gas under sufficient pressure to inflate the envelop considerably. This requires a great volume of gas, involving high cost and great weight and much time to fill the balloon and make an ascension. In my invention, however, the gas to inflate the envelop and give the area to the balloon sufficiently to displace the desired volume of air in ascension is contained in the tubes A and there is no necessity for charging the chamber B with more than enough gas to eject the air from the said chamber sufficiently to give the desired buoyancy; in fact, usually it will be possible to leave in a certain proportion of air. It is not intended to charge the chamber B too heavily in the form shown in Fig. 2, as it is designed that the bag or air-receptacle F shall be distended within the balloon at times, and the gas pressure should therefore be light. Air may be pumped out of the chamber B before or while introducing the gas if desired.

I may, if desired, use, or omit altogether, sand-ballast in the car or basket G. If I wish the balloon to ascend immediately to a considerable height, there is no reason why I should use any sand-ballast in the car. In fact while for convenience such ballast may be employed at the outset of making an ascension, it is my design to do away with the same altogether. To this end, if the balloon is to go up to a moderate height, I start with the air-receptacle F partly open to contain a volume of air. The buoyancy of the balloon, its size, weight and the capacity of the air-receptacle F, are preferably such that if the air-receptacle is well distended and well filled with air, the balloon will descend to the ground without the necessity of letting out any gas from the chamber B, for once the gas has escaped, this impairs the ascending power of the balloon; and that when the air-receptacle F is deflated the balloon will have such great buoyancy as to ascend as high as may be desired.

If this air-receptacle is partly filled with air the weight of such air will weigh the balloon down, so that it will in transit range at a fairly low altitude. If it is desired to ascend, the air is withdrawn from the air-receptacle and this weight being removed from the balloon it will ascend to a higher level. When it is desired to descend to earth the air-receptacle F is opened out as far as possible or as far as may be necessary and is filled with sufficient air to so weigh down the balloon that a landing may be made.

It is obvious that by means of the pump I this air-receptacle can be pumped up with air, and also exhausted at will. I may dispense with all cords and simply use this pump. By the use of the cords, however, the air may be quickly expelled by collapsing the bag or air-receptacle F, by pulling the cords $g'$ and $g$ so that ascents may be made more rapidly; and similarly by opening out the bag or air-receptacle F, by pulling the cords $h'$ and $h$ and opening the valve $e$, air will immediately rush into said receptacle F and fill the same and cause quicker descents. In the construction shown this operation may be performed by the cords and the bag may be further exhausted by the pump I, or it may be filled with air under as much pressure as the strength of its fabric will permit.

It will be seen that by means of my balloon as thus described, the aeronaut may make ascents and descents at will, and after landing may ascend again and return to his point of departure or proceed farther on his journey.

It will also be observed that the sudden ascents and descents caused by changes in temperature may be counteracted by varying the weight of the balloon through the exhaustion or filling of the air-receptacle F. The balloon-body will not be so subject to the danger of expansion under heat as the quantity of gas used for the distention of the balloon envelop is so very much less than in ordinary balloons, and by the use of the tubes A the balloon-body will be less likely to contract under contraction of the gaseous contents within the same. Should air be used for the inflation of the tubes A this effect of temperature will be very largely eliminated. It will also be observed that by the use of my invention, sand-ballast may be wholly eliminated. This sand-ballast is objectionable for many reasons, but the most important is that when the ballast is once thrown over it can not be brought back. I employ a ballast which when once thrown out, can be taken in again by reason of employing the air in which the balloon floats. Neither are drags or trailers needed, these being also undesirable for many reasons and only useful under conditions such as passage over water at low altitudes, where such a device may be used. There is the further advantage of my invention that the balloon-body is not an unduly light body, and the car or basket unduly heavy by carrying ballast. My balloon is much more stable, not only because of the form of its casing, but because the weight is better distributed and such weight as is used is upon the balloon-body and not the car or basket, which greatly tends to increase the stability of the balloon in transit especially in gusts of wind.

I come now to an even more important and strikingly novel feature of my invention—instead of filling the chamber B with gas, I rarefy or partially exhaust the air within it, and no gas whatever is then needed therein for making the balloon ascend. The tubes A, being inflated, the balloon will ascend if only the chamber B be not filled with air. If this chamber B is of the relative size, shown in Fig. 1, the weight of air would keep it from ascending, though if the tubes A were of great width and when inflated with gas left but a small chamber B, this would not prevent ascension.

In the form shown in Fig. 1, all that is necessary is to take sufficient air out of the chamber B and this I can do by exhaustion or rarefying much more simply than by pumping in gas to displace it.

By means of my invention, I can also dispense with the use of any gas whatever and make a balloon which will levitate without the aid of gas, or any foreign medium, for obviously if the tubes A are inflated with air, the balloon is distended sufficiently to displace a volume of the atmospheric air equal to its own volume, and if the chamber B is pumped out to create a partial or sufficient vacuum there, the weight of the balloon will be no greater than if the air in the chamber B were displaced by gas, indeed it might be less.

The far-reaching effects of this will be seen when it is noted that here is a balloon which may be inflated anywhere with an air-pump without any gas whatever and may be caused to ascend and descend *ad libitum*, and an explorer or tourist, or army scout, or soldier, may visit any region, remain as long as he desires, and return by the balloon in which he came.

Of course, if gas is used to inflate the tubes A, the balloon will be so much lighter and so much less need the air be pumped out from the chamber B. Similarly if gas is used in the chamber it will help to decrease the pressure upon the outside of the tubes A, though by reason of their circular form and thorough inflation and consequent outward pressure, they offer such a resistance to atmospheric pressure and to the shock of contact with obstructions that this may not be a perceptible factor in practice, except in forms where the diameter of the tubes A is very great and their width or sectional diameter relatively slight, and I have devised a form of the invention for use in very large balloons, which will be hereinafter described.

In cases where air is pumped out of the chamber B and no gas used therein, whether the tubes A be inflated by gas or by air, the cords $h$ and $h'$ are obviously unnecessary, and in fact while these cords may as shown in Fig. 9, be covered with rubber tubes as they pass through the openings in the plug and be substantially air-tight, they would perhaps be undesirable as well as needless, in this particular form.

In Fig. 2 I have shown the same device as in Fig. 1, with the exception of the cords $h$ and $h'$, and the brace ring H is also eliminated, and I have shown two pumps I and I', one to fill and exhaust the air-receptacle F and the other to exhaust, or it even may be to fill, the chamber B.

It will be observed that in this form, the air-receptacle F will always be normally distended when the valve $e$ is open to let in air, as the pressure of the rarefied air in the chamber B will be sufficiently less than that of the normal atmospheric air in the receptacle F to permit the latter to distend said bag fully; though it will usually be desirable to open the valve only for long enough to partially fill the receptacle, especially if the air in the chamber B be highly rarefied and of consequently light pressure. If a large quantity of air is necessary to cause descent of the balloon at any given time, air may be let in the central chamber B through the filling tube $j'$, which will aid the descent of the balloon and also permit us to let still more air in the receptacle F, without unduly increasing the difference of pressure within and without the air-receptacle, which would be undesirable, for this bag, unlike the balloon-body formed by the tubes A and the envelop E, is incapable of standing the strain of very great difference of pressure upon its inner and outer surfaces.

The receptacle F may be dispensed with, and the air allowed to enter directly in the chamber B for descending, and be pumped out for ascending, as hereinafter described in the form Fig. 3, but this bag is very useful by enabling quick ejection of the ballast-air as well as quick entry. By pulling the cords $g'$ and $g$, the receptacle F is folded down and the air therein expelled from the balloon through valve, causing it to ascend at once. By releasing the cords, and opening valve $e$ for a brief time, enough air will enter to cause descent. At times, when further descent is desired, or if the balloon is especially buoyant, air is then admitted to chamber B direct through tube $j'$, and when next ascending may either be let remain there if sufficient ascent is made by folding down the receptacle F, or the air in chamber B may be reduced by pumping out an amount equivalent to that introduced therein. In short, the receptacle F governs lesser ascents and descents, and for greater, the chamber B is brought into play. The extent to which the air in the chamber B is rarefied is of course a matter of degree and of adjustment, depending upon the size of the balloon, the sectional diameter of the tubes A, the weight of the material used in the construction of the balloon, the weight carried by the balloon, and the desired lifting or levitating capacity. As is well-known, slight increase in the size of a balloon makes considerable difference in its lifting-power, as the displacement area is always much more increased than is weight added in materials used, and I favor adequate size in the balloon, rather than to make it as small as possible and very highly rarefy the air in the chamber B.

In Fig. 3, I have shown a rather more simplified form in which I dispense wholly with the receptacle F. In this form the central chamber B is pumped out to the extent desired for ascents, and air admitted through valve $j^2$ for descents, and pumped out again for re-ascent. In this figure I have also shown two strengthening rings or tubes H' which range vertically through the chamber B, and are inflated with air to desired pressure, though of course they may be inflated with gas, particularly in such forms of my invention where gas is used in the balloon. These strengthening rings may be used in any or all forms of the balloon as shown in the various figures of the drawings. I have not shown them in all to avoid repetition. Both these rings H' and the horizontal ring H of Fig. 1, may be used in the same balloon, one ring fitting inside of the other where they cross, or they may communicate or pass through one or the other, as shown in Fig. 7. In Fig. 3 I have also shown the tubes A bound and tightly secured together by silken, wire, or other binding filaments $k$ to hold the tubes tightly together and in place, and the tubes may also be cemented in addition.

Where my invention in its most complete form is used, eliminating wholly all gas from the balloon, it will be observed that a chief cause of peril in balloons, which has caused the loss of many aeronauts, namely fire and explosion, is avoided. Not only does a gas-balloon stand always in danger of ignition of escaping gas, but explosion through other causes is also liable owing to the great expansibility of gas under increase of temperature, so that it bursts the fabric.

In Fig. 4 I have shown a form in which the balloon envelop is composed of two concentrically disposed casings or cylinders J and J', arranged one within the other to form a hollow cylindrical or elliptical body with a long central chamber B', the casing being secured together by a series of parallel circumferential seams $l$, afterward covered with water-proof and gas-tight balloon varnish.

In this figure the car G' is suspended below to hold the cylinder substantially horizontal or at any desired inclination up to practically or nearly a vertical position, with adjusting ropes M to regulate the degree of inclination.

The ends of the cylinder are narrow somewhat and they are provided with large valves or shutters K. The hollow area between the two casings H is inflated with gas and the shutters K being open, the balloon is of such size and relative displacement, and weight, to be buoyant enough to ascend when one end is pointed upwardly and by turning the balloon to a full horizontal position, or closing the shutter or valve K at the lower or rear end, or both said valves or shutters K, a volume of air is confined within the chamber B and further air may be pumped into the same by means of the pump $I^2$, or if the balloon has an engine and a propeller as shown, the balloon may be forced ahead and air will be forced through the valve K at high pressure into the chamber B, the said valve being normally closed and opening inwardly. Valves K are operated by suitable cords K' and $K^2$, the first for closing and the second for opening.

When sufficient air is forced into the cylinder the valve K may be held closed by tightening the rope K' and by the pressure of air within the cylinder and further air may be pumped thereinto by the pump $I^2$.

In Fig. 5 the balloon is shown elliptical or somewhat pear-shaped with the car depending from the lower end thereof, it being formed of the tubes A and envelop E, similar to Figs. 1, 2, and 3. In this form the tubes A are inflated with gas.

The central chamber $B^2$ formed therein is opened at top and bottom and the atmospheric air is free to pass through the same vertically, the balloon being sufficiently buoyant to rise. In the top of the balloon I have a valve or valves L normally opened by its weight and closed by a cord $l'$. At the base of the balloon I have shown four valves or shutters M operated by cords M'. These are normally closed by their weight and by auxiliary cords $M^2$ which may be tied to hold the valves in closed position.

In the operation of this form, any desired quantity of air is confined in the chamber $B^2$ by closing the valves M, which weighs down the balloon, and to make a speedy ascent the valves are all opened and the balloon relieved of its weight of air immediately ascends. Any appropriate amount of air may be pumped in by the pump I.

In Fig. 6 I have shown a modification of the balloon in which the tubes A are of varying or graduated widths as well as of decreasing diameters from the center of the balloon to its upper and lower ends.

In Fig. 7 I have shown a form in which the outer envelop is dispensed with, the tubes A are cemented together and may also, as hereinafter described and shown in Fig. 14, be tightly bound together by the filaments or binding $k$, and are coated, upon the outside and inside of the sphere which they form, with balloon varnish. Around the outside and inside of the balloon are strengthening and bracing tubes $G^3$, inflated and extending around the balloon horizontally and vertically or in any other desired position, being shown joined or communicating where they cross one another. These tubes $G^3$ are inflated as hard as necessary to best assist in holding the tubes A rigidly in place. Either one of the said tubes $G^3$ or all four, or any desired number, may be employed either in this or any other form of my balloon. They may also be used upon or in connection with any balloon whatever.

The pressure in each tube A may also in this or any of the other forms be varied and one tube inflated slightly more than others, as may in some contingency be desired. In general, however, the pressure in all the tubes should be substantially the same. In some of the figures I have shown the separate valves for inflating and deflating the tubes A.

In Fig. 8 I have shown a detailed view of the upper portion of the same form as in Fig. 7, but with the outer tube $G^3$ connected to each of the tubes A by means of short tubes $G^4$ provided with check valves $G^5$.

By this means all of the tubes A may be simultaneously inflated, but I prefer to provide the said tubes A each with a separate valve in addition, so that if one deflates it will not deflate the others and so that when desired the pressure may be increased in any of the tubes. In this form of the device, and in fact in other of the forms, the balloon, if in a collapsed condition as for packing or transportation, may be inflated by simply pumping up the tubes A with air until the balloon-body is sufficiently distended, and leaving the valve or valves closed, which would let no air into the central chamber B, or by only opening said valves until the balloon is partly inflated so that only a small amount of air will enter. In this way, when the balloon is inflated the central chamber B will be found sufficiently free of air to avoid the necessity of pumping it out with a vacuum pump. I do not, however, confine myself to this proposed way of inflating the balloon either in the form shown in Fig. 8 or otherwise.

In Fig. 9 I have shown a form of the balloon in which the air is admitted directly to the central chamber B and exhausted therefrom as in the form shown in Fig. 3, from which the air may be quickly ejected, similar to the plan shown in Fig. 1.

Referring to Fig. 9 in which the construction is otherwise substantially the same as in the other spherical balloons of Figs. 1, 2, 3, 6, 7 and 8, I secure preferably to the central tube A of the balloon a flexible diaphragm N to which is attached a cord $N^3$, passing it through a small tube $N^1$ or otherwise through the lower end of the balloon. By drawing down this cord $N^3$, which may be connected to a stiffening disk $N^2$, any air which is in the lower portion of the chamber B will be expelled through the valve, provided of course the same is open, and as the portion of the chamber B upon the said diaphragm is partially exhausted of air, the balloon will ascend by reason of the diminution of weight. If it is desired to descend all that is necessary is to release the cord $N^3$ and either open or permit to open the valve e and air will immediately enter the lower portion of the chamber B and will force the diaphragm up toward or against the upper portion of the walls of the said chamber B, the extent to which it will be forced up depending upon the amount or proportion of air remaining in the upper portion of the chamber after it has been partially exhausted.

This ingress of air weighs down the balloon and it descends.

Should this diaphragm break in the operation of the balloon, no harm will be done, as the valve will be closed, and the balloon will remain practically at whatever height it was when the break occurred. If more air is desired, it may be admitted through the valve to the balloon or pumped in, or if air was being expelled at the time, it may be pumped out; a break in this diaphragm cannot cause damage.

In Fig. 10, I have shown a very large dirigible balloon drawn on a much smaller scale than the other figures. In this form, on account of the great size of the balloon or air-ship, I make a very large number of the tubes A and instead of making them of decreasing diameters and superposing them to form a sphere, I make them all substantially of the same size and place them in a large ring or annular casing O shown in elevation and partial section in Fig. 11, and in cross section thereof in Fig. 12. While the rings A in these figures are of very much reduced size in the drawing, they may be in practice quite as large as the rings shown in the small spherical balloons in the other figures of the drawing, and they are inflated in just the same way. I may, however, on account of the great number of these rings A dispense with all valves in them and hermetically seal them. This indeed I could do in any form of the balloon shown in any of the figures, but it would not then be collapsible, nor would it be possible to vary the pressure from time to time in the rings or any of them. In a large dirigible balloon, however, there will probably arise no reason why the rings A may not be hermetically sealed after inflation, when they are all inclosed in a ring as shown in Figs. 10, 11 and 12. It will be understood that these rings A form an inner chamber $B^3$ the same as the chamber B in every way except that it is annular or ring-shaped in form, instead of spherical.

If the rings A are inflated and air expelled from the chamber $B^3$, either by the use of gas or by partial exhaustion, the ring or annular casing O will then itself constitute a single balloon, or buoyant levitating body exactly the same as one of the spherical balloons heretofore described. I provide a number of these rings O thus filled with the tubes A and place them side by side in a cylindrical or cigar-shaped or spherical envelop or casing P, and if cigar-shaped or spherical the rings O at either end must be graduated and decrease in diameter. With these rings O thus secured together they form a second vast central chamber $B^4$ from which air is similarly expelled by the entry of gas or by partial exhaustion through a valve $B'$. The chamber $B^3$ in the rings O is exhausted or partly filled with gas through a valve $O'$, or it may be found in practice that such chamber $B^3$ may be partially exhausted and sealed, as it is not necessary to admit air into the chamber $B^3$ during operation of the balloon, such air being admitted into the main chamber $B^4$.

The operation of this form of large balloon will of course be obvious from the previous descriptions.

Instead of the rings O being filled with the tubes A, as shown in Figs. 11 and 12, I may, as in Fig. 13, make the tube O of two layers of fabric $O^2$ and $O^3$ seamed together by stitching $O^4$ which will form tubes $A^2$ instead of having both ring O and separate tubes A inserted in the same. This is on the same plan as shown in Fig. 4.

In Fig. 14 I have shown a detailed fragmentary view of the upper portion of a spherical balloon. I may in this spherical balloon or any of the forms shown in the drawings, instead of superposing a number of annular tubes A, make one continuous tube $A^3$ spirally disposed so as to form the sphere, cylinder or other desired shape of body. This is of advantage not only in cheapness but also in simplicity and readiness of inflation. Of course, the puncturing of one portion of this tube $A^3$ would deflate the whole shell of the balloon, but this could be overcome by sealing off the tube $A^3$ at intervals, and separately inflating in sections or portions through separate valves, a few of which I have indicated thereon. In this figure I have also shown a casing or lining Q which may be cemented inside of the chamber B or inside of the chamber $B^3$ of any of the forms shown, instead of using the exterior casing or envelop E, or in addition thereto. If this lining is used it should be well cemented to the tubes throughout its entire surface.

In Fig. 15 I have shown the spherical balloon form made of two spherical casings $R^1$ and $R^2$, seamed together by stitching $R^3$ forming the rings or annular tubes in the casing instead of separate therefrom, and a connected circular body $R^4$ closing the sphere at top and bottom. This is on the same plan as in Fig. 4 and Fig. 13. The advantage of making the shell of the balloon in this way instead of with separate tubes is chiefly saving of fabric and weight, but on the other hand, with the separate tubes and casing there is added strength and one is better and more easily able to replace a tube in case of breakage or leak.

It will be observed that I do not show skeleton-frames or solid braces in my balloon envelop as is customary in large balloons and air-ships. It is a remarkable advantage of my invention that all such braces and framework are rendered unnecessary, and the elimination of their great weight is an important factor. I may of course in addition use any braces or framework which may be found necessary and desirable in any part of the balloon, and do not restrict myself in this particular.

It will also be noted that the air or gas in the inflated shell of the balloon is under a pressure greater than atmospheric pressure, and sufficient to give the desired degree of stiffness and rigidity to said shell; that the air or gas in the inside of the balloon will be under much less pressure; and that the air introduced for ballast may be under such pressure as desired.

Any of the forms of balloons herein shown and also the tubes A, O and all other parts of the balloon may be made of any desired material. The tubes A may be made of the same material as the envelop of the balloon, such as silk, rubber, rubberized or any other common balloon fabric, and any or all of the same may be coated with any suitable balloon varnish.

It will be observed that the balloons may all, with the possible exception of the large dirigible shown in Fig. 10, be deflated for packing and transportation, and it will also be noted that any method may be employed for exhausting or partially exhausting air in the central chamber of the balloon, whether this be by a vacuum pump or by inflating the shell when the balloon is collapsed and little or no air contained in it, as hitherto described, or any other means for rarefying the air therein may be employed.

Many modifications and variations in mechanical detail may be made in my invention without departing from the spirit thereof, nor from its main substance, and I do not confine myself in any particular to the use of any special details, or forms of construction.

Having thus fully described my invention, what I claim is:

1. A balloon or the like comprising a distended exterior shell forming an inner vacuum chamber; the shell being distended or inflated under pressure of air to a predetermined area, which said area of shell remains independent of the degree of inflation or exhaustion of the inner chamber, whereby the balloon will descend if the inner chamber is not exhausted, and means for admitting and controlling the admission of air to said inner chamber, the inner chamber being filled with air at normal or higher pressure when the balloon is descending or descended, and exhausted of air when levitating.

2. A balloon or the like comprising an air-inflated exterior casing composed of air-filled tubular rings of decreasing diameters toward each end or pole of the balloon forming a central vacuum chamber, in the interior of which air is admitted under its own atmospheric pressure and will cause the balloon to descend by reason of the air-filled casing being heavier than air unless centrally exhausted.

3. A balloon formed with an inflated shell of predetermined area which area of said shell it maintains independent of the degree of inflation or exhaustion of its interior, and with a central vacuum chamber of sufficient dimensions and extent of exhaustion or rarefaction to make the balloon ascend without the aid of any gas lighter than air, and an air inlet leading directly into the vacuum chamber from the outer air.

4. A balloon formed of a plurality of hollow air-filled tubular rings, each of a uniform sectional width throughout, and superposed one upon the other to form a shell or casing, with a central chamber within the area thereof.

5. A balloon formed with an air-inflated shell of predetermined area which it maintains independent of its interior inflation or exhaustion and with a central vacuum chamber, an air-let leading directly into the vacuum chamber, whereby when opened the air normally fills the vacuum chamber without pumping the same in and whereby said balloon will be caused to descend without additional air, and means within the vacuum chamber for ejecting the air therefrom.

6. A balloon or the like provided with an air-inflated shell of predetermined area which it maintains independent of its interior inflation or exhaustion and with a central vacuum-chamber sufficient to levitate the balloon without foreign gas, an air-inlet leading directly into said levitating or vacuum chamber, to automatically fill the same, and means under the control of the balloon operator for exhausting the vacuum chamber of most of its air at one movement.

7. A vacuum balloon having a shell of predetermined degree of inflation independent of the degree of inflation of its inner portion, and provided with a central ejecting means, formed to draw in air from the atmosphere at one movement, and expel it by an opposite movement, without altering the external area of the balloon or the degree or strain of inflation of its shell.

8. A vacuum-balloon formed with an inflated shell the area of which shell is independent of the degree of inflation or exhaustion of its interior and with a central vacuum and ballast chamber and provided with an air inlet leading thereinto, and an air ejector therein.

9. A vacuum balloon formed with an inflated shell the area of which shell is independent of the degree of inflation or exhaustion of its interior and with a central vacuum and ballast chamber and provided with an air-inlet leading directly into the vacuum chamber thereof.

10. A vacuum balloon provided with a plug in its vacuum chamber, and an air inlet in said plug.

11. A vacuum balloon formed with an inflated shell the area of which shell is independent of the degree of inflation or exhaustion of its interior and with a central vacuum and ballast chamber and provided with an air inlet leading directly thereinto, and adapted to descend, upon opening said air inlet only, by automatic inflow of air.

12. A vacuum balloon formed with an inflated shell the area of which shell is independent of the degree of inflation or exhaustion of its interior and with a central vacuum and ballast chamber and provided with an air-inlet to make it automatically descend by the mere opening of said inlet, and means for ejecting the air thereafter to restore the vacuum.

13. A vacuum balloon formed with an inflated shell the area of which shell is independent of the degree of inflation or exhaustion of its interior and with a central vacuum and ballast chamber and provided with an air inlet whereby it normally and automatically descends upon the opening of said air inlet, and means for opening the same.

14. A balloon formed with an inflated shell the area of which shell is independent of the degree of inflation or exhaustion of its interior and with a central vacuum and ballast chamber and formed centrally into a vacuum chamber, an air inlet leading thereinto, said balloon being normally levitating while said inlet is closed, and normally non-levitating when it is open.

15. A balloon formed with an inflated shell the area of which shell is independent of the degree of inflation or exhaustion of its interior and with a central vacuum and ballast chamber and having a central vacuum chamber containing rarefied air, and provided with an ejector therein to exhaust the air therein.

16. A balloon or the like formed of an inflated shell the area of which is independent of the degree of inflation or exhaustion of its interior, said shell forming with a central vacuum chamber, means for dividing said chamber into compartments, one of said compartments being free of air, and means for extending the volume of either compartment alternately.

17. A balloon or the like comprising a series of air-filled rings each of a uniform sectional width throughout joined to form a central chamber exhausted of air, whereby the balloon levitates, and an air-inlet whereby the balloon is automatically air-filled by opening the inlet.

18. A balloon or the like comprising a series of inflated rings, a plug closing an end ring, and an air inlet in said plug.

19. A balloon or the like comprising a series of air inflated rings forming a central chamber exhausted of air to make a levitating vacuum-balloon, and bracing devices within the vacuum chamber bearing outwardly against the inner surfaces of the inflated rings in the direction of the air distention by the air pressure within them.

20. A vacuum-balloon having an air-inlet leading directly into its vacuum chamber, whereby to automatically fill the vacuum chamber by the mere opening of the air inlet without other mechanical means, and means under the control of the operator of the balloon for ejecting said air without altering the area of the balloon externally.

21. A balloon or the like formed with an inflated shell the area of which is independent of the degree of inflation or exhaustion of its interior, and provided with a single combined levitating and ballast chamber.

22. A vacuum balloon or the like formed with an inflated shell the area of which is independent of the degree of inflation or exhaustion of its interior, and provided with a combined buoyancy and ballast chamber.

23. A vacuum balloon formed with an inflated shell the area of which is independent of the degree of inflation or exhaustion of its interior and provided with a single combined levitating vacuum-chamber and ballast-chamber connected with the outer air.

24. A vacuum balloon formed with an inflated shell the area of which is independent of the degree of inflation or exhaustion of its interior and provided with a single combined buoyancy and ballast chamber, an air-inlet to make it a ballast chamber, and means for restoring the vacuum therein.

25. A vacuum balloon formed with an inflated shell the area of which is independent of the degree of inflation or exhaustion of its interior and provided with means whereby the degree of rarefaction of the air in its vacuum chamber is varied, so that the said vacuum chamber becomes at times a ballast chamber.

26. A balloon or the like comprising an exterior air-tight envelop, a series of air-inflated rings within said envelop, and superposed tightly one upon another, and devices for closing the ends or poles of the balloon.

27. A balloon or the like comprising a series of inflated rings of varying diameters arranged to form an air-tight body, and closed within the centers of the smallest rings at each end or pole.

28. A balloon or the like comprising a series of separate air-inflated rings of varying diameters, plugs to close the end rings thereof, and means for holding the rings together.

29. A vacuum-balloon formed with a series of inflated rings to produce a central vacuum chamber, a separate ballast compartment, means for extending the ballast-compartment within the vacuum chamber, to enable air under normal pressure to flow in against the absence of pressure in the bag due to its location within the vacuum chamber, and an air inlet leading to the ballast compartment.

30. A balloon or the like formed of a plurality of superposed air-inflated rings, and having a central vacuum chamber, a separate air-compartment mounted within the vacuum chamber, in such manner that upon admitting air to the said air-compartment it will at once expand into and partly fill up the area of the vacuum chamber under the normal pressure of the outer air entering the same.

31. A balloon or the like having a central vacuum chamber, a separate collapsible air-receptacle therein, an air inlet communicating with said air-receptacle so that on opening said air inlet said air-receptacle will automatically fill, and means for collapsing said air-receptacle to restore the area of the vacuum chamber.

32. A balloon or the like formed with an inflated shell, and having a central vacuum chamber, and a separate air receptacle within the same, and air inlets leading to both the central chamber and the air-receptacle whereby opening the inlet to the air-receptacle will admit air thereto by the expansion of the said receptacle within the central vacuum chamber, while opening simultaneously or thereafter the inlet valve to the central chamber as well, will admit air to both said chamber and receptacle, thereby causing the balloon to descend with double or increased speed.

33. A vacuum balloon or the like having a distended outer shell, an inner vacuum chamber sufficient to levitate the balloon, an inner ballast-chamber, and valves mounted to open or close said ballast chamber so that it fills with air automatically by expansion into the non-resisting vacuum chamber.

34. A balloon or the like comprising a series of inflated rings, varying in diameter and joined together, an outer envelop surrounding same and a valve or valves projecting from said rings toward said envelop to inflate same.

35. A balloon or the like comprising a series of inflated rings, plugs sealing the ends of same, and one or more interior rings bearing outwardly against the inner faces of the plugs.

36. A balloon envelop formed of two casings, inner and outer, stitched around its periphery in transverse annular series to form equal and concentric rings, adapted to be inflated.

37. A balloon formed of a spirally wound inflated tube mounted to form a central chamber, and one or more plugs mounted within the ends of the spiral tube.

38. A balloon or the like comprising a distended envelop composed of a series of superposed rings, and forming a central chamber exhausted of air, whereby it will consequently ascend, and means for admitting air to the balloon to cause it to descend without altering the external area of the balloon.

39. A balloon or the like, composed of a series of rings each air-inflated and secured together to form a closed chamber within the same, sufficient when exhausted, to cause the balloon to ascend, and means under the control of the aeronaut for admitting air to and ejecting it from the said central chamber without altering the external area of, nor internal pressure against, the said rings or the balloon-shell formed thereby.

40. A balloon or the like composed of a series of concentric rings filled with air to form an air-distended casing, and a central vacuum chamber formed thereby, and means for causing air to enter the balloon to increase its weight.

41. A vacuum balloon formed of a series of rings, each of uniform sectional width throughout, and inflated to form a distended casing, said rings being superposed and secured together whereby they range around the periphery of the balloon, from one end or pole of the balloon to the other, and means for closing the said ends or poles of the said balloon.

42. A balloon or the like provided with an envelop formed of a series of rings air-inflated whereby they are distended to resist external pressure forming a central chamber, and exhausted of air within the same, and means for letting air in and pumping it out, governed by the aeronaut during transit whereby the vacuum or amount or pressure of air in the central chamber is regulated during transit of the balloon, without altering the external dimensions thereof.

43. A vacuum-balloon having its envelop distended by a series of concentric air-filled rings to form a vacuum chamber, whereby it rises without the aid of any foreign gaseous element, and means for increasing the weight of the same during transit enough to overcome the levitation of said vacuum-chamber without altering the external dimensions thereof.

44. A balloon or the like having two separate chambers, one a tubular envelop to distend the balloon independent of its inner contents, and the other a central chamber normally exhausted of air, and provided with air inlets thereinto, under the control of the aeronaut, whereby balloon may be caused to descend without altering the external dimensions thereof nor subjecting the envelop thereof to undue distention.

45. A balloon or the like comprising a body formed with two separately inflatable or exhaustible chambers, one a distended or exhaustible chambers, one a distended casing, and the other an inner vacuum chamber, valves for admitting air to the casing under pressure, and valves for admitting air to the inner portion of said balloon independently of the said valves of the casing.

46. A balloon or the like, consisting of a hollow air-inflated shell or envelop, of a predetermined exterior form and dimensions both unalterable during transit and independent of the degree of inflation or exhaustion of the inner contents or central portion of the balloon, thus forming a definite vacuum chamber within the same of size equal to the interior dimension or area of said balloon, and means under control of the aeronaut for admitting air to said interior chamber to cause the balloon to descend, without thereby distending the envelop of the balloon and diminishing the descent thereof by increasing its displacement, and means under the control of said aeronaut for ejecting air therefrom without altering the dimensions of said envelop.

47. A balloon or the like comprising a casing embodying a series of tubes inflated with air, and forming within the same a chamber exhausted of air, means for admitting air into said balloon during transit, and a separate air chamber in said balloon into which said air enters.

48. A balloon or the like whose interior area constitutes a closed vacuum chamber, sufficient to make the body self-levitating, the shell of the balloon being unalterable during transit, and an inner air-receptacle located in the vacuum chamber, and adapted to be expanded therein to occupy a portion thereof, and means for causing the said air-receptacle to become air-inflated during transit, so as to expand into and reduce the area of the vacuum chamber to such extent that the balloon will descend.

In testimony that I claim the foregoing as my invention I have signed my name in presence of the subscribing witnesses this 4th day of October, 1912.

PERCY T. GRIFFITH.

Witnesses:
 Louis Salter,
 A. W. Griffith.